Oct. 16, 1928.
A. MOORHOUSE
MOTOR VEHICLE LAMP
Filed Sept. 27, 1926
1,687,877
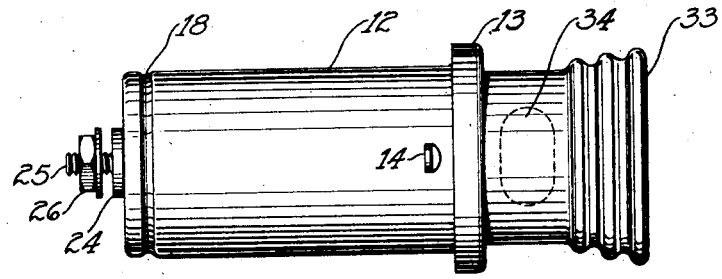
FIG.1
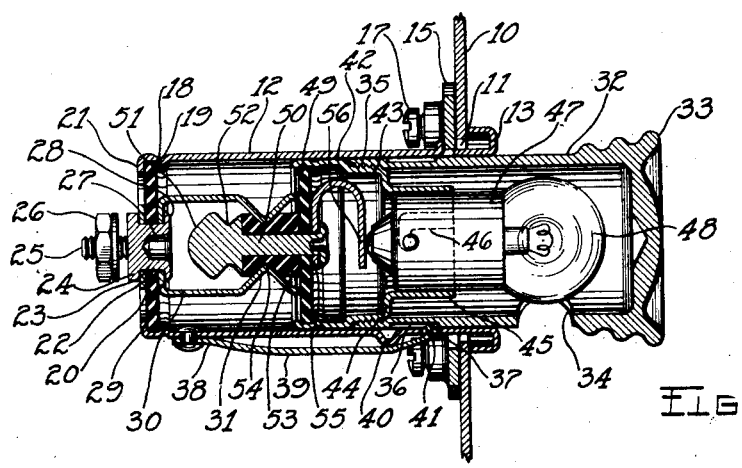
FIG.2
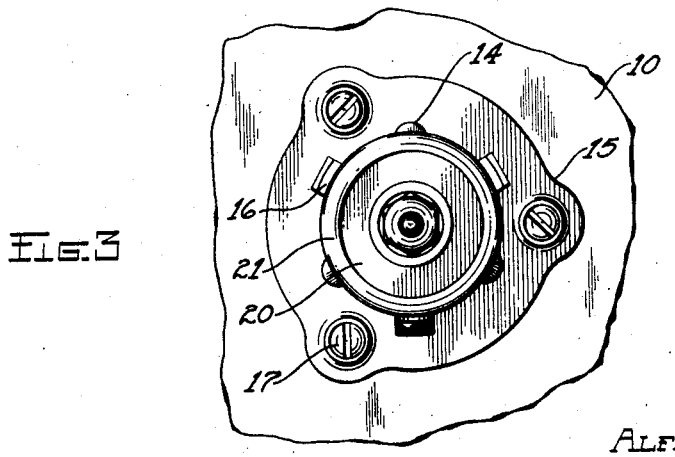
FIG.3
Inventor
ALFRED MOORHOUSE
Attorney Patented Oct. 16, 1928.

1,687,877

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE LAMP.

Application filed September 27, 1926. Serial No. 137,992.

This invention relates to motor vehicles and particularly to lamp structure or instrument board lamp structure for motor vehicles.

An object of the invention is to provide a lamp for the instrument board of a motor vehicle designed to avoid a separate and independent switch for controlling the operation thereof.

Another object of the invention is to provide a lamp for the instrument board of a motor vehicle which may be rotated to project light at any radius therefrom.

Another object of the invention is to provide a lamp for the instrument board of a motor vehicle having a unique means whereby it may be easily and quickly mounted and when once mounted and adjusted will be maintained in a rigid position.

Yet another object of the invention is to provide a lamp for the instrument board of a motor vehicle having its various parts designed to facilitate a rapid disassembly thereof for the purpose of inspection, replacements or repairs.

A further object of the invention is to provide a lamp for the instrument board of a motor vehicle having all the appearances of a finished knob, which when pulled outwardly closes a circuit to light a lamp mounted therein, the knob being free to revolve to project light at different angles and susceptible of being rotated and of being pushed inwardly to open the circuit and extinguish the light at any position it may occupy upon being revolved.

Still a further object of the invention is to provide a lamp for the instrument board of a motor vehicle which is highly efficient in operation and yet of marked simplicity as a whole and in respect to each of its component parts, so that its manufacture is economically facilitated both as regards to the parts and their assembly.

Other objects will appear from the following description taken in connection with the drawings, which form a part of this specification, and in which:

Fig. 1 is a side elevation of the lamp with the sleeve or collar for mounting the same removed.

Fig. 2 is a longitudinal sectional view of the lamp mounted in the instrument board of a motor vehicle, illustrating the position of the various parts when the lamp circuit is opened, and Fig. 3 is a rear end elevation illustrating the mounting means.

Referring by numerals to the drawings, 10 represents an instrument board of a motor vehicle which may be of any desired type or style. Mounted in an aperture 11 in the instrument board is a socket or cylindrical section 12 having at one end thereof, a turned flange 13 adapted to bear against the front of the board around the aperture 11. Punched from or otherwise formed upon the socket 12 adjacent to the flange 13 is a plurality of lugs 14 which are spaced apart and bent to extend radially.

A sleeve or collar 15 is fitted snugly upon the socket 12. The collar 15 is provided with a plurality of notches 16 arranged to register with and to slip over the lugs 14. This collar is also provided with a plurality of set screws 17. The socket 12 is placed in the aperture 11 with its flange 13 bearing against the front of the instrument board. The collar 15 is then slipped over the socket and the lugs 14 thereon. In this position the collar will bear against the back of the instrument board. The collar is then given a slight turn and upon tightening the set screws 17, the socket 12 will be secured in a fixed position.

The other end of the socket 12 has in its outer circumference a pressed groove 18 which forms an internal shoulder or seat 19 for the support of a disk 20 which may be of any suitable insulating material. The disk 20 is secured in place by crimping or turning the end of the socket as shown at 21. This disk 20 may be otherwise mounted as for instance by punching lugs from the socket to engage the respective sides thereof.

The disk 20 has a central aperture 22 in which is mounted a terminal. The terminal comprises a stub shaft 23 formed with a flange 24 bearing against the exterior face or side of the disk 20 with a washer interposed and a threaded boss 25. Threaded upon the boss 25 is a tap 26 for attaching the conductor from a source of electrical energy, not shown. The shaft 23 has a central bore 27 and is turned to form a flange 28 to clamp between itself and the interior face or side of the disk 20 a spring contactor 29. The contactor 29 is formed with two arms 30 bent to extend parallel with respect to each other and laterally within the barrel 12. The arms 30 are provided with corresponding and oppositely disposed V-shaped portions 31 adjacent to their free ends, the object of which will be hereinafter explained.

Mounted telescopically in the socket 12, is a cylindrical section or hollow plug 32 having formed upon one end thereof a knob 33 by which it is manipulated, and adjacent to the knob is a cut out portion 34, the object of which will hereinafter appear. Upon the outer circumference of the cylinder or plug near its other end, which is internally threaded as indicated at 35, is a broad circular groove 36 adapted to register with a slot 37 in the wall of the socket 12. Riveted or otherwise secured to the socket is a spring tongue 38. The tongue 38 is arched as indicated at 39 and normally rests upon a boss 40 swedged from the socket adjacent to the slot 37. The free end of the tongue is bent as at 41 to project through the slot 37 and engage the groove 36. In order to remove the plug from the socket the arched portion 39 of the tongue 38 is pressed. This action raises the end 41 from engagement with the groove 36, leaving the plug free to be withdrawn.

A short section of the plug comprising a cylindrical section 42 of the same diameter as the plug or cylinder 32, is provided upon one end with a contracted neck portion 43 externally threaded to engage the threaded portion 35 in the end of the plug cylinder 32. The neck portion 43 has a flange 44 supporting a sleeve 45. The sleeve 45 is provided with a standard bayonet socket 46 for the reception of a lamp 47. The lamp 47 is positioned in the plug or cylinder 32 to place its bulb 48 opposite the cut out portion 34 through which light from the lamp is projected.

Mounted in the other end of the section 42, is an insulating disk 49 having a central bore in which is mounted a contactor comprising a stud 50. The stud 50 is formed with a head 51 having a circular V-shaped groove 52 adapted for engagement with the V-shaped portion 31 on the contact arms 30. Mounted upon the stud 50 intermediate the head 51 and the insulating disk 49 is a sleeve 53 of insulation having in its circumference a groove 54 similar to that in the head and likewise adapted to co-operate with the portions 31 of the contact arms. The stud 50 projects through the disk 49 and is upset upon a washer 55 having formed integral therewith a spring 56 which contacts with the base contact of the lamp.

It is to be observed that the sections 32 and the short section 42 are threaded together in such a manner that they may be easily and quickly separated for inspection or for purposes of replacement and repairs. When these two sections have been assembled with their parts properly adjusted, the unit so assembled is shoved into the socket 12 where it is held against displacement by the tongue engaging the groove 36.

When the assembled unit which constitutes the plug, is shoved in to the full extent the contact arms are brought to bear in the groove 54 in the insulating sleeve 53. In this position contact is broken and the light is extinguished. By pulling outwardly upon the knob the contact arms are brought to bear in the groove 52 upon the contactor head 51 thus closing the circuit, the current passing through the stud 50 and the contact spring 55 to the base contact of the lamp. By this arrangement a unique switch mechanism is provided. The outward and inward movement of the plug is limited by the width of the groove 36 upon the circumference of the section 32. When the light is on it may be revolved by the knob 34 to project light at any angle parallel to the instrument board. This is accomplished by the unique mounting of the plug 32 in the socket 12 and the arrangement of the electrical connections or switch mechanism which permits the revolving of the sections 32 and 42 as one complete unit or unitary plug.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

Having thus described the various features of my invention, what I claim as new and desire to secure by Letters Patent is:

1. A lamp structure comprising a socket member, a plug member mounted to rotate and to move longitudinally in the socket member, interlocking means comprising a tongue extending through the socket member and engaging the plug member permitting rotary and longitudinal movement of the plug member, a lamp in the plug member, a terminal for the lamp and a contact means for the lamp actuated by the longitudinal movement of the plug and permitting rotation thereof.

2. A lamp structure comprising a socket, a support upon one end of the socket, a terminal in the other end of the socket, a hollow apertured plug interfitting the socket, a spring pressed stop between the socket and the plug, a knob upon one end of the plug, a contactor in the other end of the plug, a lamp in the plug in circuit with the contactor, the lamp mounted to project light through the aperture and co-operative contact means between the terminal and the contactor whereby the circuit of the lamp is closed when the knob is pulled outwardly and opened when the knob is pushed inwardly, the co-operative contact means permitting the rotation of the lamp to project the light at any radius.

3. A lamp structure comprising a socket, a lamp-carrying plug interfitting the socket, a contactor carried by the plug having a plurality of annular grooves one of which is insulated and means in the socket for alternately engaging the grooves upon longitudinal movement of the plug.

4. A lamp structure comprising a socket, a hollow plug mounted in the socket, a lamp mounted in one end of the hollow plug, a contactor mounted in the other end of the hollow plug in circuit with the lamp, a plurality of annular grooves in the contactor one of which is insulated and a forked contact in the base of the socket adapted to engage the grooves in the contactor.

5. A lamp structure comprising a socket, a hollow cylindrical two part plug, one of the parts having a knob on one end and an aperture in its circumference, the other part having a lamp support on one end and a switch member in the other end, a spring contact between the switch member and the lamp support, the switch member having a plurality of grooves, and a spring fork in the base of the socket for engaging the grooves.

6. A lamp structure comprising a socket, a hollow cylindrical two part plug threaded together, a lamp mounted in one part and a contactor in circuit with the lamp, the other part having a knob upon one end and an aperture in its wall adapted to register with the lamp and means in the socket for contacting with the contactor on the plug.

7. A lamp structure comprising a socket having a flange, a plurality of lugs adjacent to the flange and an expandible means including a collar adapted to be pressed into engagement with the lugs between the flange and the lugs.

8. A lamp structure comprising a tubular member having a flange, a plurality of lugs struck from the tubular member in spaced relation to the flange and an expandible means including a collar adapted to be pressed into engagement with the lugs mounted between the flange and the lugs.

9. A lamp structure comprising a tubular member having a flange, a plurality of lugs struck from the wall of the tubular member in spaced relation to the flange, and expandible means including a notched collar on the tubular member between the flange and the lugs.

10. A lamp structure comprising a tubular member having a flange, a plurality of lugs struck from the tubular member in circumferential alinement in spaced relation to the flange, a demountable collar upon the tubular member and means mounted in the collar for creating and maintaining a pressure between the flange and the lugs.

11. A lamp structure comprising a socket member having a contact therein, a plug member adapted for longitudinal and rotary movement in the socket member, the plug member carrying a lamp and a contact, said contacts adapted for engagement and disengagement upon longitudinal movement only of the plug member in the socket member.

12. A lamp structure comprising a socket member having a contact therein, a plug member adapted for longitudinal and rotary movement in the socket member, the plug member carrying a lamp and a contact, said contacts adapted for engagement upon outward longitudinal movement only of the plug member in the socket member and for disengagement upon inward longitudinal movement of the plug member.

In testimony whereof I affix my signature.

ALFRED MOORHOUSE.